Dec. 4, 1923.
N. S. BLACK
FLOAT VALVE
Filed May 14, 1921
1,476,029
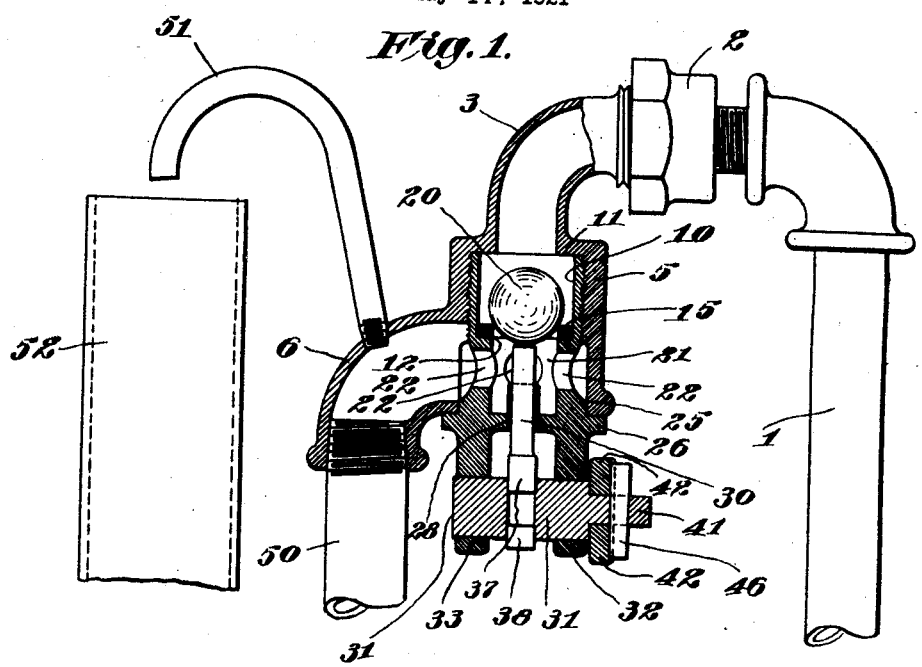
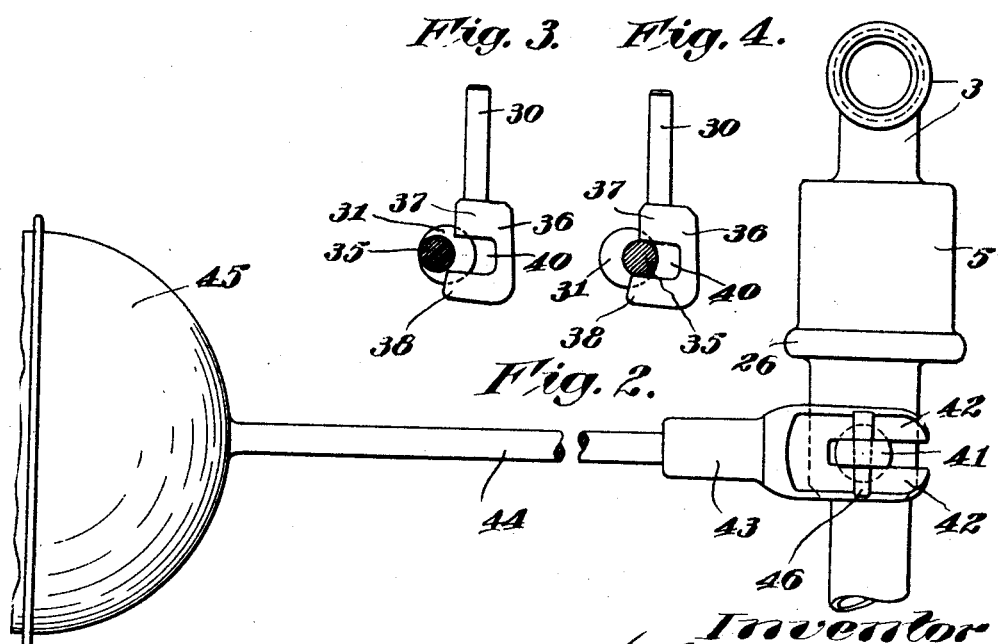

Patented Dec. 4, 1923.

1,476,029

UNITED STATES PATENT OFFICE.

NATHANIEL S. BLACK, OF NEWTONVILLE, MASSACHUSETTS.

FLOAT VALVE.

Application filed May 14, 1921. Serial No. 469,668.

*To all whom it may concern:*

Be it known that I, NATHANIEL S. BLACK, a citizen of the United States, and resident of Newtonville, in the county of Middlesex and State of Massachusetts, have invented an Improvement in Float Valves, of which the following description, in connection with the accompanying drawings, is a specification, like letters on the drawings representing like parts.

My present invention is an improved and novel float valve or ball cock, and important objects of the invention are to provide a simple, efficient and quick acting valve of this type.

Further important objects of the invention are to provide a valve which will seat with the pressure of the water supply; to eliminate all springs or the like; to afford a simple construction which will be operative on a relatively slight movement of the float; to maintain the moving and operating parts of the valve above and therefore normally out of the water of the tank to which the apparatus is applied, and to enable a renewable valve seat or washer to be quickly, easily and readily renewed.

In carrying out my invention I have devised an extremely simple and efficient arrangement of the movable part which will facilitate assembling the same, enable all portions of the valve to be easily and conveniently reached, and furthermore to design a valve of this type which will be positive in its action and capable of use with high pressure water supply. By having the valve closed by and with the pressure of the supply, the greater the pressure the tighter the valve will close, and furthermore should the float or similar operative parts connected therewith be damaged, broken or removed, the valve will, of course, remain closed and prevent leakage during such condition. I prefer to connect the float and rod carrying the same directly to a shaft which carries an eccentric operating a rod adapted to raise the ball valve from its seat, against the water pressure and thereby obtain a very quick acting and efficient device.

In preferred form I arrange my improved valve in connection with a water tank for flushing the water closets, to automatically maintain a water supply, and I also provide a branch refill pipe and a "hush pipe", the end of the latter (not shown) being maintained at all times under water. Thus I obtain the advantages of a noiseless operating valve free from danger of leaking, insuring the action of the refill from the beginning of the water flow until it is entirely shut off. By having the moving parts on the discharge side of the valve it is not necessary to have the same water tight, as the valve itself shuts off the pressure and the operating portions in connection with the float and rod need not be water tight One of the important advantages is the feature of the removable valve seat or ring which can be quickly reached, readily removed and easily replaced. I prefer to make this valve seat of metal as well as the valve ball, preferably having the valve seat of soft metal and the valve ball of relatively hard metal, so that the action of the ball against the seat will serve to quickly form contact in a manner to eliminate any inequalities between the two contacting surfaces, and thus insure a tight metallic seat. While I prefer to use metal and therefore to have the advantage of an all metal valve and without springs, yet I contemplate using any suitable material for this valve seat, such for example as hard or soft fiber, leather, composition or other suitable material. The valve seat can afford a relatively large opening and fit snugly about the ball nearly adjacent the diameter of the same, so that the slightest lifting of the ball from its seat by the action of the float and associated parts, will afford a full flow of water through the valve.

Further advantages, novel combinations and important features will be hereinafter more fully pointed out and claimed.

Referring to the drawings, illustrating a preferred embodiment of my invention,

Fig. 1 is a view partly in cross-section illustrating my improved valve construction applied to a tank (not shown) of usual type;

Fig. 2 is a plan view illustrating the ball or float and connection therefrom to the valve;

Fig. 3 is a fragmentary view illustrating the assembling of the valve operating rod and the eccentric actuating same; and Fig. 4 is a view showing the eccentric and valve in position for operation of the apparatus.

It will be appreciated that I can make my valve of any suitable size, and capable of application to different uses, varying pressures of supply, etc., and also of different material. Preferably and as herein shown I form the valve of non-corrosive metal, such as brass, and construct the same, preferably, entirely of metal, being an all-metal valve, although as above noted, the renewable washer may be of other material.

Referring to the drawings, 1 shows a supply pipe, 2 designates the union thereto, which is fitted in a convenient position and within sight, reach and easy operation at the top of the tank (not shown), 3 the elbow from the supply to the valve proper, 5 designating the valve casing, to which is formed as an integral part thereof the outlet 6. The valve casing 5 is constructed with a valve chamber or recess, in which is threaded a bushing 10, abutting against a shoulder 11 at the interior and topmost part of the valve chamber, the upper interior part of the valve casing 5 being correspondingly threaded. This bushing 10 has formed on its lower portion a seat 12, on which a removable washer 15 is fitted. I am enabled to make this washer and seat of relatively large diameter to afford a greatest possible volume of flow of water therethrough when the ball 20 is raised from the seat. The lower portion of the cage 21 is formed as a cage 21, with a plurality of openings 22, 22, 22, therethrough, to permit the flow of water through the valve and out of the outlet 6. The lower part of the cage is formed as illustrated at 25, having a flange 26 adapted to abut against the lower portion of the valve casing 5. Through the bottom part of the bushing 10 as shown at 28, I provide a recess to guide and receive a valve stem 30, which stem or rod is adapted to lift or raise the ball 20 from the seat 15 and open the valve.

In order to operate the valve and raise or lift the ball 20, I have devised a novel arrangement consisting in a shaft, 31, adapted to rotate in recesses or bearings in extensions 32 and 33, which latter are formed as a part of the cage 10. This shaft 31 being provided with an eccentric 35 and the outermost end of the stem or rod 30 is fitted with a yoke 36 being in the form of two arms 37 and 38, the former being the innermost one and extending somewhat above the latter and a recess 40 therebetween, the latter adapted to fit over the eccentric portion 35 of the shaft 31 and between the adjacent sides or walls of the shaft which are milled to form the said eccentric 35, as clearly shown in Figs. 1, 3 and 4. In assembling this rod and its yoke, I rotate the shaft 31 with the eccentric 35 in outermost position, which enables the shorter arm 37 of the yoke to be slid by the eccentric when the rod is fitted within the recess in the cage provided therefor and thereupon the shaft 31 is partially rotated and the eccentric 35 engages in the recess 40 and remains therein during the further operation of the valve. I have so arranged and positioned my construction that a quarter rotation of the shaft 31 is sufficient to raise and lower the valve rod 30 and thus lift or seat the ball 20, and thereby prevent the eccentric 35 escaping from the recess 40, since the rotation of the shaft is limited,—in operative use,—to such partial turn. To effect a partial rotation of the shaft 31 and the operation of the valve, I extend the shaft 31 at one side as shown at 41, this extension being milled or ground off and presenting a flat surface on each side to receive the forked end 42, 42, of the head 43 which is a part of the float rod 44, carrying the float or ball 45 at its outermost end, which latter is adapted to float upon the water within the tank and with sufficient weight to rotate the rod 31 and raise the ball 20 against the pressure of the water supply. A cotter pin 46 holds the forked end 42, 42 in assembled position.

The apparatus as thus far described is complete and operative. The water supply flowing through the pipe 1, union 2 and elbow 3 and into the valve casing, serves to normally hold the ball 20 firmly upon its seat 15, increased pressure increasing the tightness of this valve and preventing leakage. It should be noted that there are no joints in the valve subject to the water pressure, excepting, of course, the union 2 which is a part of the regular piping. All other portions of the valve are beyond the pressure and when the valve is opened it is of course immaterial whether or not the water may leak through the bearing for the sliding rod 30 or not, the main flow being out through the openings 22 and discharge pipes 6. When the water level supporting the float 45 is lowered, the corresponding lowering of the float 45 and rod 44 partially rotates the shaft 31 and the eccentric portion 35 thereof lifts the rod 30, raising the ball 20 against the pressure and permitting a water flow through the valve. As the level rises and the ball 45 rises correspondingly the eccentric 31 rotates sufficiently to lower the rod 30 and permit the ball 20 to again seat upon the washer 15. When it is desired to renew the washer, which is the only wearing part in the valve, the entire cage and bushing 10 are unscrewed from the casing 5, the ball lifted, the washer 15 removed and replaced, and the cage re-threaded back into the valve casing 5 and the entire apparatus is ready for use. As herein shown I have illustrated the valve in connection with a tank for flushing water closets and the like having an overflow pipe, and have also attached to the outlet 6 a hush pipe 50. This may extend entirely down to the bottom of the tank (not shown), so that its lowermost opening is normally below the lowest level of water. I am enabled to utilize this construction and thereby afford an absolutely noiseless flushing tank because my valve operates with the pressure and a sufficient flow at all times is provided to fill the tank through the hush pipe 50 irrespective of its opening below the water level within the tank. Also I provide a refill branch 51, to extend to and supply water to the overflow pipe 52—partially illustrated. During the flow of water through the valve and particularly because of the hush pipe 50 extending below the water level and thereby checking up the flow of water freely therethrough, the branch pipe 51 is immediately utilized as a part of the water discharge.

It will be appreciated that I have devised an efficient, simple and easily accessible and renewable valve construction, preferably working with the water pressure, enabling all the working parts to be above the normal level of water in the tank and also beyond the effect of leakage from the water pressure. Furthermore, the only renewable portion, i. e., the seat or washer 15 is readily accessible, easily removed and renewed, and is of large diameter, permitting a quick and full flow of water therethrough, as soon as the ball is partially lifted. The ball 20 itself will wear indefinitely, always reseating in a different position, and with the washer 15 of softer metal or if desired of fiber or the like, the ball 20 will soon effect a quick and tight seating in case the seat and ball are not ground to fit with accuracy.

My invention is further defined and described in the form of claim as follows:

A valve of the kind described, comprising a casing containing a movable valve member and a valve seat, cooperating therewith, a sliding rod to separate said valve and valve seat, said rod having an outwardly extending yoke, a shaft formed with an eccentric adapted to operate within said yoke and with portions of said shaft straddling the yoke, said eccentric and yoke being constructed and arranged whereby the yoke may be assembled on the shaft in inoperative position and held assembled in operative position by engagement of the yoke and eccentric portions.

In testimony whereof, I have signed my name to this specification.

NATHANIEL S. BLACK.